United States Patent [19]

Coombs

[11] 4,268,288
[45] May 19, 1981

[54] CYCLONE VACUUM CLEANING APPARATUS

[76] Inventor: Peter J. Coombs, 89 N. Parker Way, Bountiful, Utah 84010

[21] Appl. No.: 57,158

[22] Filed: Jul. 12, 1979

[51] Int. Cl.³ .............................................. B01D 45/12
[52] U.S. Cl. ....................................... 55/337; 15/353; 55/429; 55/458; 55/472
[58] Field of Search ...................... 55/320, 337, 459 R, 55/467, 471, 472, 459 A, 458, 429; 15/327 D, 353, 314

[56] References Cited

U.S. PATENT DOCUMENTS

| | | | |
|---|---|---|---|
| 739,263 | 9/1903 | Kenney | 55/320 |
| 2,171,248 | 8/1939 | Berkel | 55/392 |
| 2,393,766 | 1/1946 | Gordon | 55/459 R |
| 2,624,516 | 1/1953 | Andries | 209/144 |
| 2,943,698 | 7/1960 | Bishop | 55/337 |
| 3,200,568 | 8/1965 | McNeil | 55/191 |
| 3,240,000 | 3/1966 | Hayes et al. | 55/337 |
| 3,320,725 | 5/1967 | Foster | 55/472 |
| 3,543,325 | 12/1970 | Hamrick | 15/314 |
| 3,618,297 | 11/1971 | Hamrick | 55/319 |

FOREIGN PATENT DOCUMENTS 149724  4/1963  U.S.S.R. ............................ 55/459 R

*Primary Examiner*—Bernard Nozick
*Attorney, Agent, or Firm*—H. Ross Workman; Rick D. Nydegger; J. Winslow Young

[57] ABSTRACT

A cyclone separator-type vacuum cleaner. The vacuum cleaner has a cylindrical housing having three sections. Each section of the housing is joined to an adjacent section by latches provided on the housing. By releasing the latches the internal mechanisms of the vacuum cleaner can be easily accessed for cleaning or maintenance. The vacuum cleaner has a first baffle that is funnel-shaped and a second baffle in the form of an outwardly-flared skirt member. The skirt member is attached at the base of the funnel-shaped baffle. The two baffles together form an exhaust path through their center through which the incoming air exits after the dirt has been separated therefrom. The funnel-shaped first baffle directs the incoming dirt-laden air inwardly in a circular path of decreasing cross-sectional area so that the speed of the circulating air is increased, causing centrifugal separation of dirt. Thereafter, the outwardly-flared skirt member redirects the incoming air outwardly and away from the exhaust path formed through the center of the baffles so that further separation of the dirt will occur prior to exhausting the air through the exhaust path.

8 Claims, 2 Drawing Figures

CYCLONE VACUUM CLEANING APPARATUS

BACKGROUND

1. Field of the Invention

The present invention relates to vacuum cleaners and, more particularly, to an improved cyclone separator for a central vacuum cleaning system.

2. The Prior Art

Cyclone separators for central vacuum cleaning systems have long been known in the prior art. Typically, cyclone separators have a cylindrical casing with a suction fan in the upper end thereof. In some types of cyclone separators, a straight cylindrical cyclone tube extends downwardly into the casing from the inlet to the suction fan. For example, see U.S. Pat. No. 2,684,125 and U.S. Pat. No. 3,308,609.

In the operation of cyclone separators of this type, incoming dust-laden air passes through a tangential air inlet and then downwardly in a circular path through a straight passageway provided between the exterior of the cyclone tube and the inner wall of the housing. The circulating action of the air causes centrifugal separation of the dirt particles, which are collected in a dirt receptacle placed below the cyclone tube. The air is then exhausted through the center of the cyclone tube and through the suction fan to an air exhaust outlet.

With this type of cyclone separator, it has been observed that some of the dust carried with the inlet air is drawn through the cyclone tube by the suction fan and exhausted therefrom before it has a chance to be separated from the air. This, of course, is undesirable because it causes unsightly pollution and a dirty appearance in the exhaust area.

Attempts have been made to overcome this disadvantage by restricting the lower end of the air passage between the cyclone tube and the casing wall. See, for example, U.S. Pat. No. 2,943,698. This type of restriction forces the air to squeeze through the restricted opening so that it will be forcefully ejected into the dust receptacle below the cyclone tube.

However, restricting the lower end of the air passage between the cyclone tube and the casing wall may be somewhat disadvantageous since it will tend to decrease the centrifugal separation of dirt particles that would otherwise occur. In particular, the incoming dirt-laden air will be squeezed as it moves downwardly in the passage thus precluding some of the centrifugal action that would otherwise occur as the air travels in a circular path.

Accordingly, what is needed is a cyclone separator-type vacuum cleaner that is designed to maximize the centrifugal separation of dirt particles from the incoming air while at the same time directing the circulating air so that it will not be prematurely withdrawn by the suction fan before the dust has had a chance to fully settle out.

BRIEF SUMMARY AND OBJECTS OF THE INVENTION

The cyclone separator-type vacuum cleaner of the present invention is provided with a novel baffle arrangement that maximizes centrifugal separation of dirt from the incoming air while at the same time directing the circulating air away from the exhaust path of the suction fan so that further settling of the dirt will occur prior to exhausting the air through the air exhaust outlet. The housing of the cyclone separator is conveniently constructed in three sections, each section being joined to an adjacent section by latches so that the housing can be easily disassembled for purposes of cleaning or repairing the internal parts of the vacuum cleaner. The housing is designed to be mounted on a basement wall as part of a central vacuum cleaning system, with inlets for the hose and other vacuum cleaning attachments placed at convenient locations throughout the house.

It is therefore a primary object of the present invention to provide an improved cyclone separator for a central vacuum cleaning system.

Another object of the present invention is to provide a cyclone separator for a central vacuum cleaning system wherein centrifugal separation of dirt from the incoming air is maximized by the use of a first baffle that is funnel-shaped so as to direct the air in an inward, circular path, and wherein the air is thereafter redirected by a second baffle configurated as an outwardly-flared skirt member that directs the air outwardly and away from the exhaust path formed through the center of the two baffles.

A further object of the present invention is to provide a cyclone separator for a central vacuum system wherein the housing is conveniently constructed in sections that may be easily disassembled to permit ready access to the internal parts of the vacuum cleaning system for purposes of cleaning or repair and maintenance.

These and other objects and features of the present invention will become more fully apparent from the following description and appended claims taken in conjunction with the accompanying drawings.

DETAILED DESCRIPTION OF THE PREFERRED EMBODIMENT

Reference is now made to the Figures wherein like parts are designated with like numerals throughout.

Figure 1:
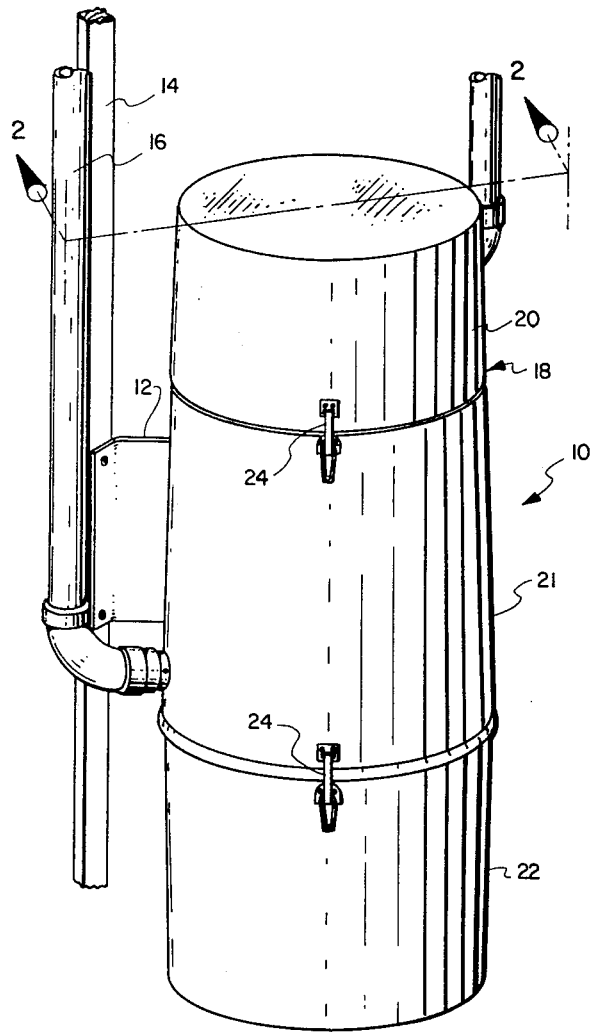
FIG. 1 is a perspective illustration of a preferred embodiment of the present invention.

The cyclone separator-type vacuum cleaner of the present invention is generally illustrated at 10 in FIG. 1. Typically, the vacuum cleaner 10 is mounted by a bracket 12 to a wall or other support member 14 in the basement of a home or building. An air inlet conduit 16 may be attached to other conduits (not shown) which run to various locations throughout the home. In this manner, a central vacuum cleaning system is provided that eliminates the need to pull the vacuum cleaner around and which simply permits the hose and vacuum cleaning attachments (not shown) to be plugged into convenient outlets (not shown) located throughout the home.

With further reference to FIG. 1, it will be seen that the housing generally designated 18 is constructed in three sections 20, 21 and 22. Each of the sections 20-22 is joined to an adjacent section by latches 24 provided on the exterior of the housing. Thus, even when the vacuum cleaner is mounted to the wall or support member 14, the housing 18 may be easily disassembled to permit the interior parts of the vacuum cleaner to be accessed for maintenance or repair.

Figure 2:
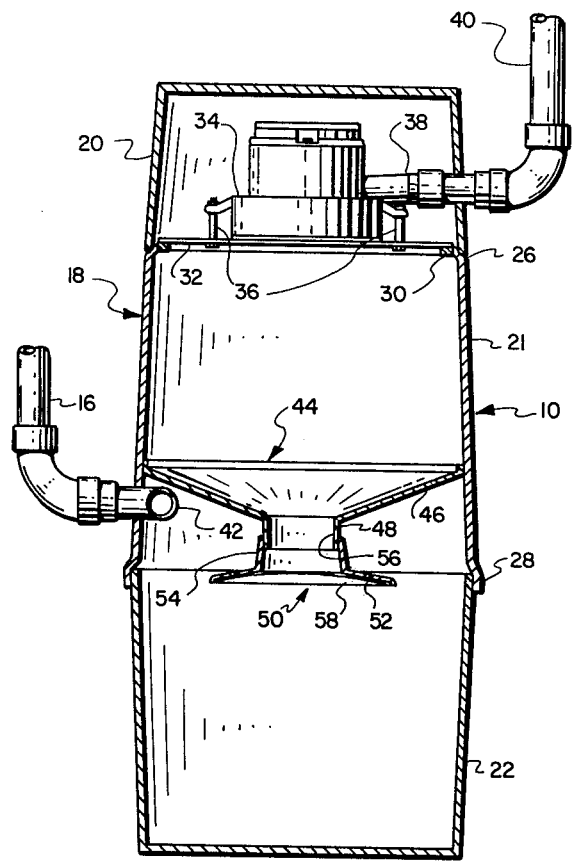
FIG. 2 is a cross-sectional drawing of the embodiment in FIG. 1 taken along line 2—2.

As shown best in FIG. 2, the upper edge of middle housing section 21 is configurated to form a shoulder 26 that supports the lower rim of the upper housing section 20. The lower edge of middle housing section 21 is configured in the form of a flange 28 that encircles the upper rim of the lower housing section 22. The latches 24 are compression latches that are designed to securely join each of the housing sections 20–22 so that the housing 18 will be airtight.

Housing 18 is of glass-filled polyester construction so that it will be corrosion-proof and dent-proof. However, it will of course be appreciated that other suitable types of material could be used to construct the housing 18.

With further reference to FIG. 2, it will be seen that the upper end of the middle housing section 21 forms an inwardly-directed annular rim 30. Rim 30 supports a circular plate 32. A motor-driven suction fan 34 is mounted to the plate 32 by bolts 36.

The outtake 38 of suction fan 34 is connected to an air exhaust conduit 40. Exhaust conduit 40 extends through the housing 18 so that the exhausted air will be expelled exterior to the housing 18. The inlet to the suction fan 34 is provided through a hole (not shown) provided at the base of suction fan 34 through the plate 32.

The motor for suction fan 34 is, in the preferred embodiment, a 120-volt 12 amp motor. It will of course be recognized that any suitable size motor and suction fan 34 could be used in order to develop the necessary suction.

A transformer (not shown) and a low voltage relay (not shown) may also be included with the motor-driven suction fan 34 in order to enable the vacuum cleaner to be turned on by plugging a vacuum hose (not shown) into wall outlets (not shown) located at various remote locations in the home.

With continued reference to FIG. 2, air inlet conduit 16 enters through the middle section 21 of housing 18 and terminates in a tangential spout 42. A first baffle generally designated 44 is mounted in the middle housing section 21 adjacent the tangential spout 42. Baffle 44 is funnel-shaped, being inwardly tapered at 46 and terminating in a short, vertical cylindrical member 48.

A second baffle is generally designated at 50. The baffle 50 has an outwardly-flared skirt member 52 connected to a vertical sleeve 54. The sleeve 54 fits over the cylindrical member 48 of baffle 44. When thus connected, baffles 44 and 50 together form an exhaust path 56 through their center. A wire screen 58 is placed over the opening to the exhaust path 56 formed by the outwardly-flared skirt member 52.

In the operation of the present invention, the motor-driven suction fan 34 will draw dirt-laden air through the inlet conduit 16 and through the tangential spout 42. The air from spout 42 is directed by the funnel-shaped baffle 44 so that it is caused to circulate inwardly in a path of decreasing cross-sectional area formed between the sides of housing section 21 and baffle 44. As the circulating air moves inwardly, it will increase in speed so as to maximize the centrifugal separation of dirt particles from the air.

As the circulating air reaches the center of the funnel-shaped baffle 44, it is then redirected as it moves downwardly and contacts the outwardly-flared skirt member 52 of the second baffle 50. The outwardly-flared skirt member 52 directs the air so that it circulates outwardly and downwardly along the walls of the lower housing section 22. In this way, the second baffle 50 directs the circulating air away from the opening to the exit path 56 formed through the center of the baffles 44 and 50. Further separation of dirt particles from the incoming air will thus occur because of settling action that is permitted to occur before the air is exhausted through the exhaust path 56.

After the circulating air has entered the lower housing section 22, it then passes through the screen 58 and through the exhaust path 56 where it enters the intake (not shown) to the suction fan. The air is then exhausted through the air exhaust conduit 40 exterior to the housing 18.

From the foregoing description, it will be appreciated that the novel baffle arrangement of the cyclone separator-type vacuum cleaner of the present invention advantageously maximizes the centrifugal separation of dirt from the circulating air by increasing the speed as the air circulates inwardly. At the same time, further separation of the dirt is accomplished by then redirecting the circulating air in an outward path down along the sides of the housing and away from the opening to the exhaust path, thereby permitting some settling of the dirt particles to occur before the air is exhausted through the exhaust path and through the suction fan. The cyclone separator-type vacuum cleaner of the present invention further advantageously is constructed so that the housing may be readily disassembled to permit access and repair or maintenance to the interior parts of the vacuum cleaner.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A cyclone separator for a central vacuum cleaning system comprising:

a housing having tangential inlet means and exhaust outlet means, said inlet means directing the incoming dirt-laden air in a circular path so as to provide centrifugal separation of dirt from the incoming air;

suction means mounted in said housing for drawing the dirt-laden air through said inlet means;

first baffle means mounted in said housing adjacent to said tangential inlet means and communicating with said suction means, said first baffle means being funnel-shaped, its walls being downwardly and inwardly inclined so as to direct the incoming dirt-laden air inwardly in a circular path of decreasing cross-sectional area, said first baffle means terminating at its lower end in a vertical cylindrical outlet member; and second baffle means including a vertical sleeve member telescopically connected to the vertical cylindrical outlet member of said funnel-shaped first baffle means, said first and second baffle means together forming an exhaust path through their center and leading to said exhaust means, said second baffle means additionally comprising an outwardly-flared skirt member connected to the base of said vertical sleeve member, said skirt extending toward the walls of said housing so as to redirect the descending circulating air outwardly toward the walls of said housing thereby channeling the circulating air away from the exhaust path provided through the center of said first and second baffle means so as to permit further separation of dirt prior to exhausting the circulating air through said exhaust means.

2. A cyclone separator as defined in claim 1 further comprising a screen placed over the opening to said exhaust path provided through the center of said first and second baffle means.

3. A cyclone separator as defined in claim 1 further comprising a support flange mounted to said housing, said support flange being adapted to be mounted to a wall or other support.

4. A cyclone separator as defined in claim 1 wherein said housing comprises a vertical cylinder having three sections, each section being joined to an adjacent section by latches provided on said housing.

5. A cyclone separator as defined in claim 4 wherein said suction means comprise a motor-driven suction fan mounted in the uppermost section of said cylindrical housing.

6. A cyclone separator as defined in claim 5 wherein said first and second baffle means are mounted in the middle section of said cylindrical housing immediately below said motor and turbine.

7. A cyclone separator as defined in claim 6 wherein the lowermost section of said cylindrical housing forms a removable dust bin placed below said first and second baffle means.

8. A cyclone separator for a central vacuum cleaning system comprising:
   a vertical cylindrical housing having three sections, each section being joined to an adjacent section by latches provided on said housing;
   a support plate mounted in the uppermost section of said housing, said support plate having mounted thereon a motor-driven suction fan;
   an exhaust conduit attached to the outtake of said suction fan, said exhaust conduit extending through the wall of said uppermost housing section so as to expel the exhausted air exterior to said housing;
   first baffle means mounted in the middle section of said housing, said first baffle means having a funnel-shaped configuration so that the space between the wall of said middle housing section and said first baffle means forms a circular path that decreases in cross-sectional area from the outside to the inside;
   an inlet conduit, one end of said inlet conduit entering said middle section of housing and terminating in a tangential spout near the top portion of said first baffle means so that the incoming dirt-laden air will be directed into said circular path, thereby providing centrifugal separation of dirt particles from the incoming air;
   second baffle means comprising a vertical sleeve member and an outwardly-flared skirt member, said sleeve member fitting telescopically over the base of said funnel-shaped first baffle means, said first and second baffle means together forming an exhaust path through their center, said skirt member redirecting the circulating air outwardly and downwardly along the walls of the lowermost section of said housing, thereby channeling the incoming air away from said exhaust path through the center of said first and second baffle means in order to permit further separation of dirt prior to exhausting said incoming air; and
   a screen placed over the opening provided through the skirt member of said second baffle means.

* * * * *